INVENTORS
William E. New and
Alan E. Collins.
BY [signature]
THEIR ATTORNEY

INVENTORS
William E. New and
Alan E. Collins.
BY
[signature]
THEIR ATTORNEY

INVENTORS
William E. New and
Alan E. Collins.
BY [signature]
THEIR ATTORNEY

INVENTORS
William E. New and
Alan E. Collins
BY [signature]
THEIR ATTORNEY 3,383,467
REMOTE CONTROL SYSTEM USING A COMMERCIAL COMMUNICATION NETWORK TO CONNECT CONTROL AND REMOTE STATIONS William E. New and Alan E. Collins, London, England, assignors to Westinghouse Brake and Signal Company Limited, London, England Filed Nov. 6, 1964, Ser. No. 409,411
6 Claims. (Cl. 179—2)

ABSTRACT OF THE DISCLOSURE

A remote control system which uses a commercial telephone network to provide individual connections between the control location and each remote station when selected by the system operator. Each station apparatus is capable of transmitting indications and receiving control functions. Station operation after selection is automatic through station identification and an initial indication period. Subsequent operation through alternate control and indication period is contingent upon the reception at the selected station of holding pulses transmitted from the control location as long as it is held active by the operator. Since control reception and indication transmission timing are therefore dependent upon station apparatus, system synchronizing means are unnecessary.

Our invention relates to a remote control system. More particularly, our invention pertains to a remote control system which uses the commercial telephone network to provide selective communication between the system control location and the several remotely controlled stations and includes an improved arrangement for holding the selected station active until released by the system operator.

In some remote control operations, the instantaneous reporting of indication function changes from the remotely located stations may not be necessary or indication changes occur only upon the transmission of a change in the corresponding control function. For example, in the remote control of certain pipe lines or conveyor systems, some of the remote locations may be provided only for measuring the flow-past of the commodity through that station location. At such a location, therefore, only recording instruments are provided and no operational control over the movement of the commodity is exercised. At most, these recording instruments may be turned on and off from the control location for selected periods of time. In such a system, obviously, it is not necessary to have a communication channel continuously in service between the control location or office and each of the several remote stations. Rather, it is sufficient to have means by which an individual station may be selectively connected to the control office in order that the existing condition of the measurement indications may be transmitted for central recording. Such a communication circuit requirement may be ideally met by a commercial telephone network in which each remote station and the control office are provided with a local telephone instrument connected to the telephone system central exchange office. It is to be noted that, in such commercial telephone networks, service is now available which will permit transmissions other than voice conversations between personnel located at the local instruments. That is, by the use of various voice frequency apparatus, various indications and data may be transmitted over an established telephone connection between what may be considered a remote station and the control office.

Accordingly, an object of our invention is a remote control system using an existing telephone network for communication between the control location of the system and the several remote stations.

Another object of our invention is a remote control system in which the control and/or indication functions are transmitted between the control location and the remote stations over circuits established in a commercial telephone network.

It is also an object of our invention to provide a remote control system using a telephone network for its communication channels and with means for holding a selected remote station active for any desired period of time.

Still another object of our invention is a remote control system operating over a telephone network and using timing means at the control and several remote stations to maintain the individually selected station active during the desired period of time.

A further object of our invention is an improved remote control system operating over selected telephone circuits between the control office and remote stations with holding pulse transmissions from the office to retain the selected station active without the necessity of system synchronizing means.

Other objects, features, and advantages of our invention will become apparent from the following specification when taken in connection with the accompanying drawings.

In the practice of our invention, the control location and each remote station are provided with a leased telephone line connected to the central exchange of the commercial telephone system for the area covered by the remote control system. The system operator at the control location or office completes connections between that office location and the individual stations through the telephone exchange over the leased telephone lines. Each remote station is provided with apparatus which is responsive to the ringing current of the telephone system to start a message announcer and a sequence controller which are part of the station apparatus. This sequence controller then continues to operate as long as the station is held active and, in turn, holds active the message announcer through interconnected station apparatus. This apparatus further operates to connect the station equipment, specifically transmitter and receiver apparatus, to the telephone line at the end of the ringing period. At the office, a switching device is actuated during the ringing period to disconnect the office telephone instrument from the line to the exchange and to couple the office apparatus to the same telephone line. This office apparatus includes an audio amplifier and speaker used to receive, in the specifically shown arrangement, the indication announcements transmitted from the selected station. Also provided at the office is a set of audio frequency tone transmitters and various selector switches to establish combinations of these tones for transmission of control functions over the network.

Immediately after the ringing period is terminated at the selected station, the sequence controller establishes circuits which couple the message announcer to the line to transmit that station's identity in order to confirm correct station selection. As specifically shown, this station identity announced is a recorder device in which is recorded a verbal message. Immediately following the confirmation of the station selection, the message circuits are switched, under the control of the sequence controller, to a circuit selected in accordance with the existing indication which is to be transmitted to the office. As specifically shown, these indication functions are also transmitted as verbal announcements over the telephone circuits. If the station is held active, this initial indication period is followed by a control period and such periods continue to alternate in sequence as long as the station remains in an active condition. Control functions are transmitted from the office as combinations of the audio frequency tones as selected by the system operator in order to accomplish the controls which he desires at the selected station. The transmitted tones are received at the station by tone receivers, the combined outputs of which are decoded and the desired control function recorded and executed.

The office apparatus also includes a pulse generator which provides a continuous series of holding pulses when activated. These pulses are transmitted over one of the audio frequency tone circuits when the office apparatus is coupled to the telephone line. At the selected station the holding pulses are received and applied to a holding circuit arrangement. This latter arrangement comprises a second sequencing or timing arrangement, pulse storage and gating apparatus, and a final holding signal storage which, when activated, holds the station in its active condition. Specifically, this second sequencing apparatus is illustrated as a pair of switching contacts controlled by a cam device driven through coupling to the message announcer previously discussed. This mechancal sequencing arrangement divides each indication and each control period into two equal portions. However, the holding pulses received during an indication period of the operational sequence are not effective at the station since the receiving apparatus is disconnected from the telephone line during this phase of the operation. However, the station holding arrangement is responsive to the reception of one or more of these holding pulses during the second half of a control period to hold the station in its active condition throughout the subsequent indication period and into the next control period in the operational sequence. Otherwise, if holding pulses are not received during a control period or only in the first half of such periods, the station is released to its nonactive condition during the subsequent indication period. These holding pulses are transmitted from the office and thus received at the selected station as long as the operator retains the office apparatus coupled to the telephone line and thus through the telephone exchange to the selected station.

We will now describe our invention in more specific detail and shall then point out the novelty thereof in the appended claims. During the specific description of our invention, we shall refer from time to time to the accompanying drawings in which:

Figure 3:
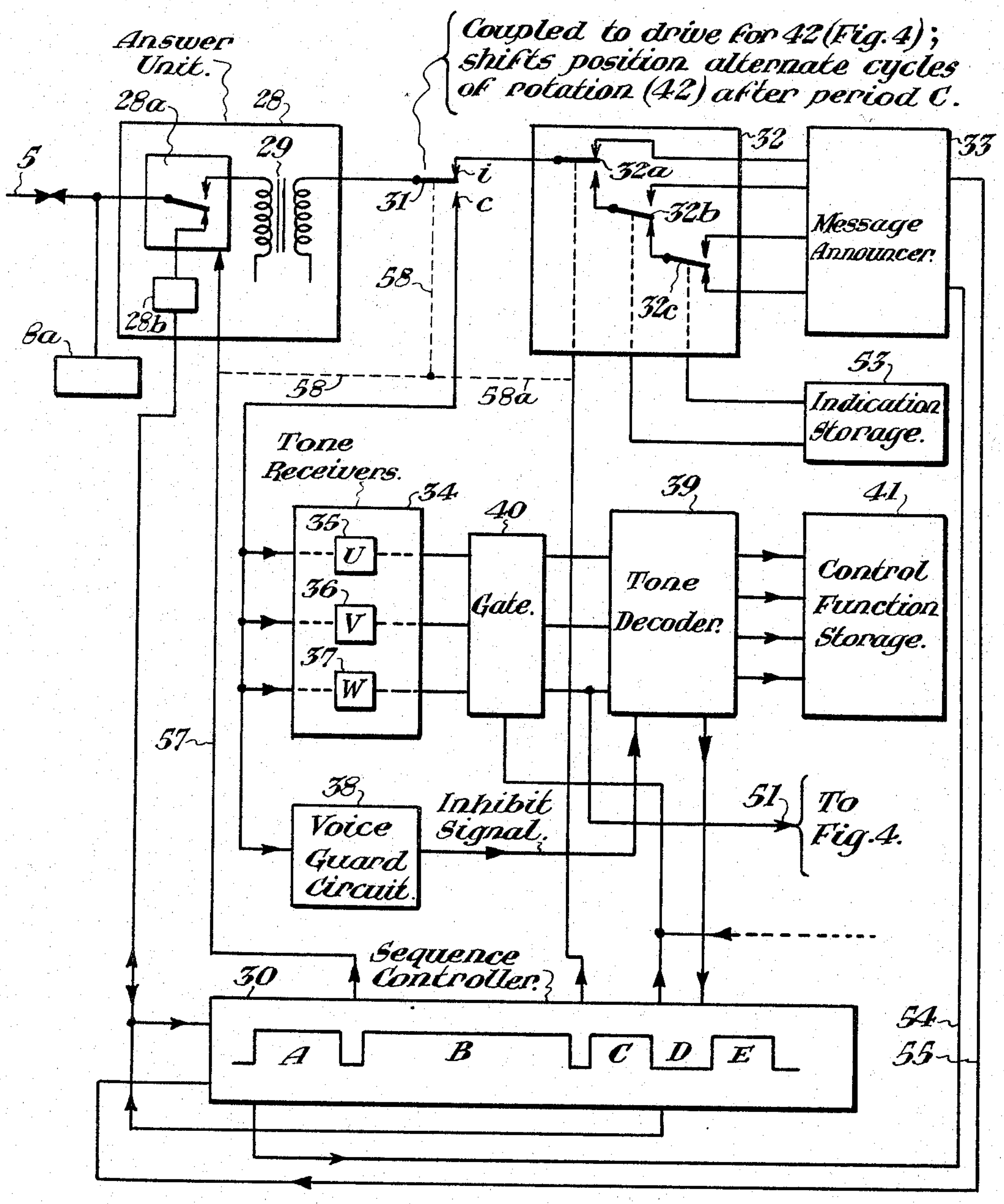
FIG. 3 is a similar type illustration of the circuits at a remote station embodying our invention which cooperate with the office apparatus of FIG. 2.
Figure 4:
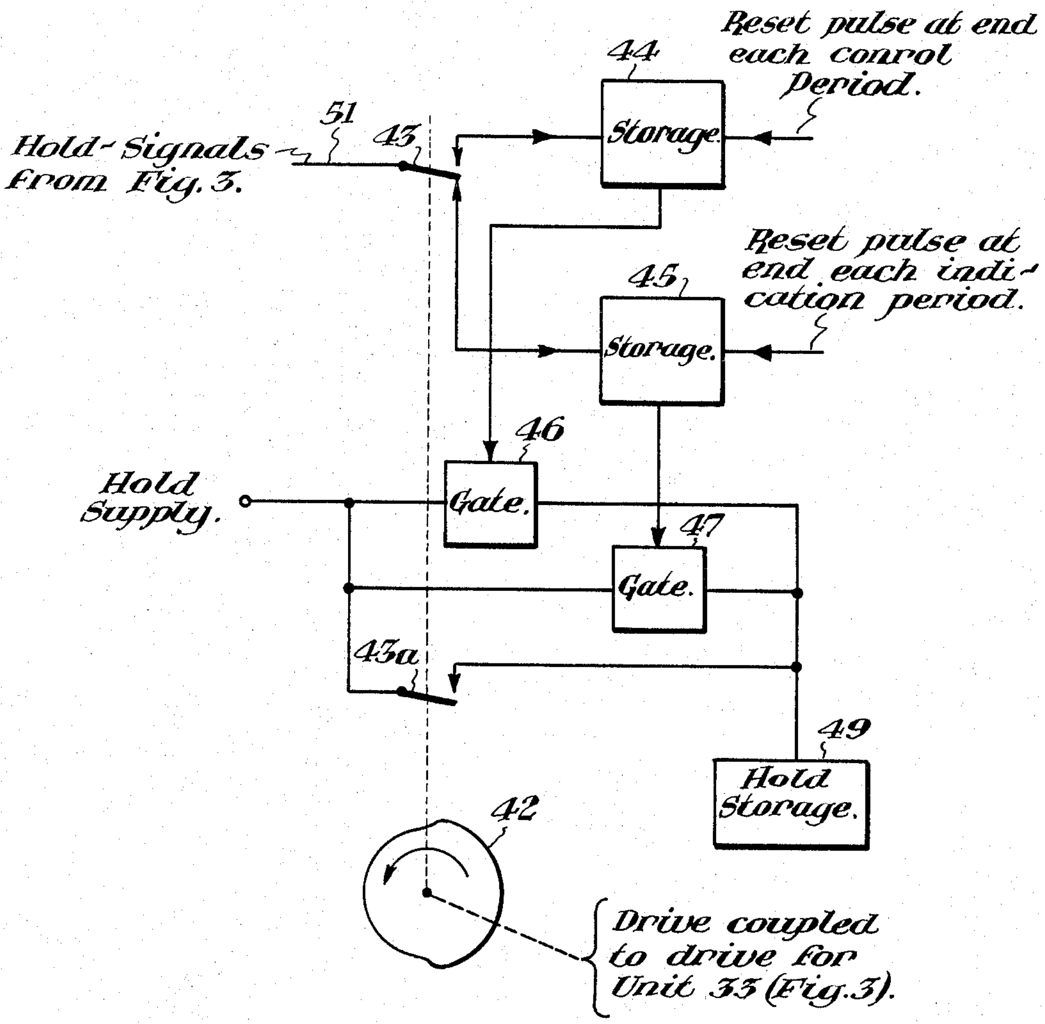

In FIG. 4 is illustrated a circuit arrangement at the station of FIG. 3 for holding the station apparatus active after it has been selected for transmission purposes.

Figure 5:
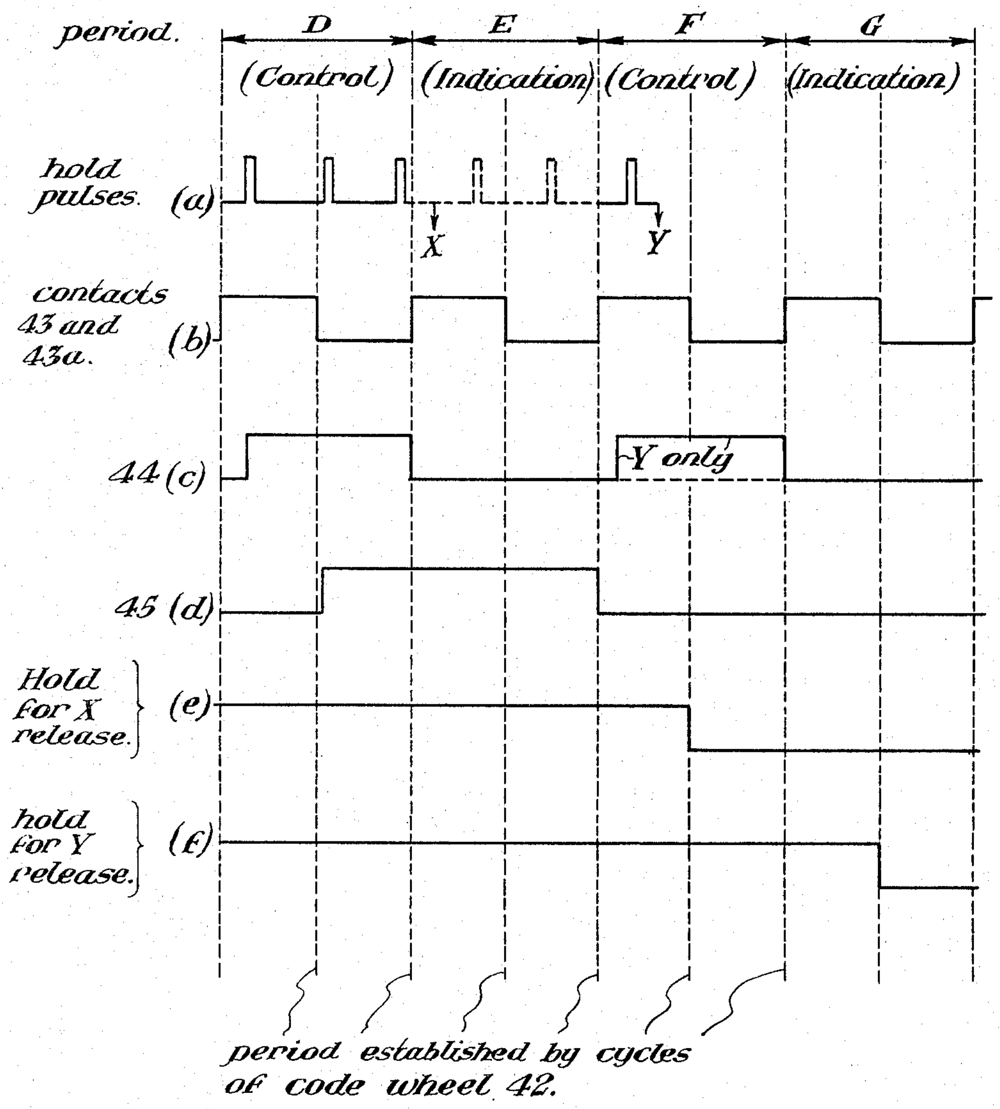

The operational timing chart in FIG. 5 illustrates the operation of the station holding apparatus embodying our invention.

In each of the figures of the drawings, similar reference characters designate similar parts of the apparatus.

Figure 1:
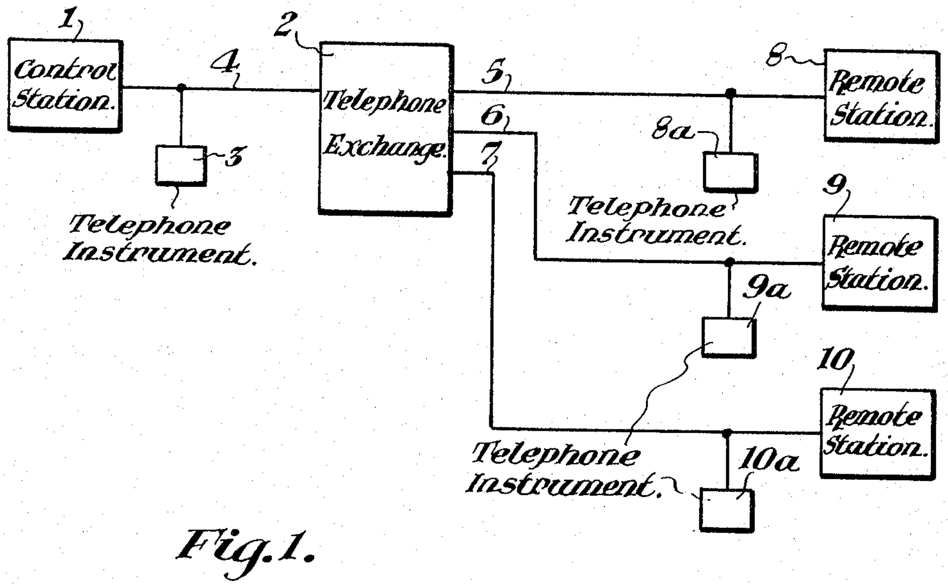
FIG. 1 is a diagrammatic showing in conventional block diagram form of a remote control system into which may be incorporated the features of our invention.

Referring now to FIG. 1, shown therein by conventional block diagram is a remote control system arranged in accordance with our invention. The system includes a control station or control office designated by the reference character 1 and three remote stations 8, 9 and 10. As will be obvious, the system embodying our invention is not limited to three remote stations, but may actually include more or less than this specific number. Communication between the office location and the stations is selectively established over an existing telephone network. Each location is connected to a central telephone exchange 2 by the usual leased local telephone circuit indicated as line 4 to the office and lines 5, 6, and 7, respectively, to the stations. As will appear, each local telephone line normally, that is, during the at-rest condition of the system, terminates in a local telephone set or instrument in the well known, conventional manner. These local telephone instruments are designated 3 at the office, connected with telephone line 4, and 8*a*, 9*a*, and 10*a* at the correspondingly numbered stations, each such instrument connected to the associated telephone line 5, 6 or 7, respectively. It will be herein assumed that telephone exchange 2 is a dial telephone office. Thus the system operator at control office 1 uses his telephone set 3 to complete a circuit, for example, to station 8, by dialing the assigned telephone number of instrument 8*a*. The communication circuit between the control office and the selected station is completed through the telephone exchange over telephone lines 4 and 5. This circuit initially will exist between the telephone instruments 3 at the office and 8*a* at the selected station. It is to be understood, however, that the remote control system of our invention need not be applied to a dial telephone network but that a manually operated telephone exchange may be used to complete the circuit connections.

Figure 2:
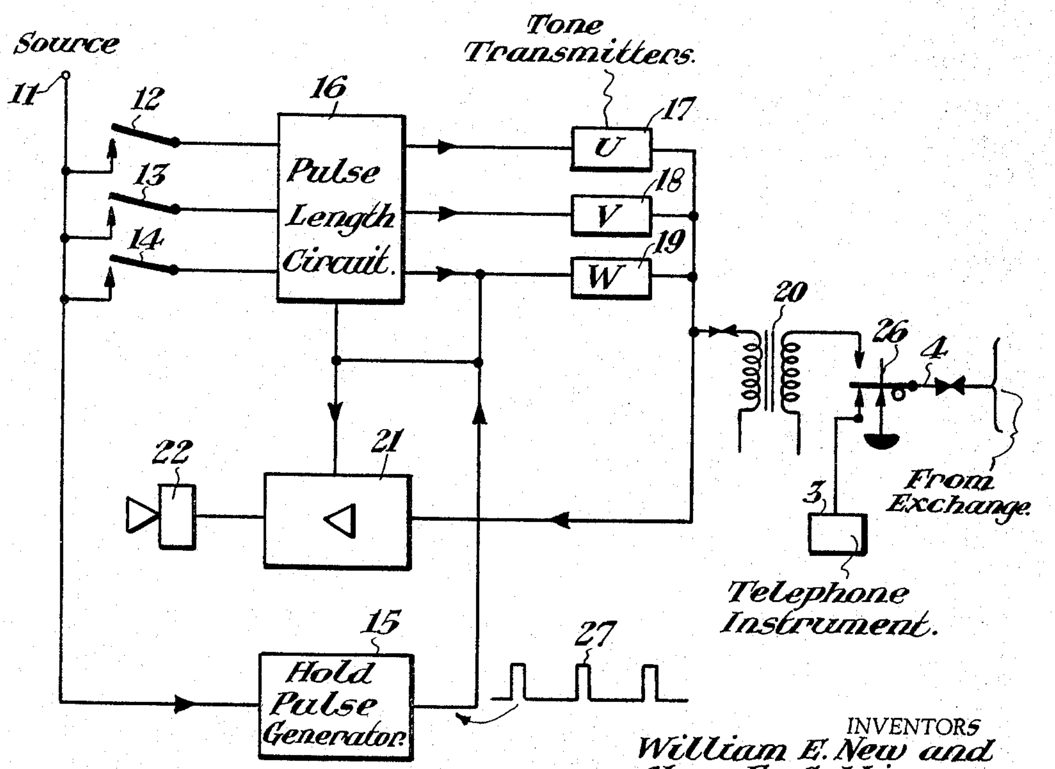
FIG. 2 is another diagrammatic illustration in conventional form showing the apparatus and circuits at the control location or control office of the remote control system, these circuits embodying one form of our invention.

The control system apparatus at the office is illustrated in FIG. 2 in a schematic form, partly by conventional block diagram. A source of energy for operating the system apparatus at the office is indicated conventionally by the single terminal 11. It is herein considered that this terminal is normally deenergized and is energized when transmission of functions by the system is desired, that is, when switch 26 is actuated. It is apparent that the control of the energization of terminal 11 may be by parallel circuitry controlled concurrently by the operation of switch 26. The function of this particular control switch will be discussed later. The office is provided with tone transmitters 17, 18, and 19. These transmitters generate tones of audio frequencies U, V, and W as indicated inside the conventional block designating each transmitter. Any known form of such transmitter apparatus may be used that will provide an output of audio frequency as required by the specific system. These tone transmitters are energized or actuated through a pulse length circuit 16 which is connected to terminal 11 through contacts 12, 13, and 14. These switch contacts are selectively closed to provide the desired combination of audio frequency tones for transmission. These contacts may, for example, be controlled by function control levers on a control panel so that the contacts illustrated are closed in the desired combination by the operation of a single control lever.

The office is further provided with a hold pulse generator 15 which provides a sequence of output pulses in accordance with the wave form shown at reference 27. In one specific application of our invention, for example, these hold pulses are of one-fourth second duration spaced apart by three second intervals. It is to be noted that the output from hold pulse generator 15 is connected to the input of tone transmitter 19. The outputs of the tone transmitters are connected through the secondary or station winding of the blocking or line coupling transformer 20. In the receiving direction, this secondary of transformer 20 is connected to an audio amplifier 21 and thence to a conventional audio speaker 22.

The leased telephone line 4 is normally connected to telephone instrument 3 through the normally closed contact of the stick type pushbutton 26. As designated by the conventional symbol, pushbutton 26 is of the type in which the armature is normally closed against the lower contact point. When actuated in the direction of the arrow shown adjacent the armature, this pushbutton closes its armature against the upper contact point and remains in that position until it is manually returned to its normal position. Such pushbuttons are well known and the symbol is here used as a matter of convenience in explaining the operation since the arrangement of our invention is not restricted to this type of pushbutton but any lever or switch key providing similar operation may be used. When pushbutton 26 is actuated, it closes the connection from telephone circuit 4 to the primary or line winding of transformer 20. This action couples the office apparatus to the telephone line circuit and disconnects telephone instrument 3.

Apparatus for one station, for example, station 8 of FIG. 1, is illustrated in FIG. 3 in diagrammatic form, partly by conventional block diagram. The leased telephone line from the central exchange, reference 5, is shown in the upper left of the circuit drawing with its connections to local telephone instrument 8*a*. For remote control system purposes, an answer unit 28 is provided which includes a ring trip and line holding unit 28*a*, a ringing detector 28*b*, and a line isolation transformer 29. With the contact of unit 28*a* in its normal position, as shown, a ringing signal over telephone line 5 when this station is selected is applied to detector 28*b*. This detector unit then actuates sequence control 30, shown at the bottom of FIG. 3, which controls the sequence of operation at the corresponding station. In the conventional illustration provided, shown within the conventional block 30 designating the sequence controller is a cycle timing form indicating the sequence of operation as controlled by this particular device. Various output connections indicated from the perimeter of the conventional block are so located as to indicate the portion of the sequence cycle in which an output pulse is provided over the corresponding connection. This simplified and conventional showing is used in order to simplify the circuits shown since the sequence controller as such is not considered to represent the novel part of our invention. Any one of several known forms of sequence control apparatus may be used.

The primary or line winding of transformer 29 is connected to telephone line 5 when the contact of unit 28*a* is closed in its upper position. This action occurs and then holds when unit 28*a* is actuated by a pulse received over connection 57 from controller 30. The secondary or station winding of transformer 29 is connected to the movable part of a switch contact 31. When contact 31 is closed against its upper contact point *i*, it establishes an indication period. While closed in its lower position *c*, contact 31 establishes a control function period. Said in another way, the upper and lower contacts associated with switch 31 thus designate periods of transmission and reception, respectively, for the station. The control of contact 31 is described later.

With contact 31 closed in its upper position, the station winding of transformer 29 is connected to the indication apparatus. Although the systems embodying our invention are not necessarily so limited, it is here considered that the indication functions are transmitted in the form of verbal announcements. Such may be transmitted over the telephone circuits and reproduced through office amplifier 21 in speaker 22. Thus transformer 29 is connected over contact 31 closed in its *i* position to switching contacts of verbal announcement control unit 32. The contacts of unit 32 select one of the announcements stored or recorded in message announcer 33. Unit 33 may be in the form of a multiple track, magnetic record reproducer such as are known in the art. A first verbal announcement selected over the upper point of contact 32*a* identifies the station number code in the dial system. It is to be noted that, as shown conventionally, the movable portion of contact 32*a* is responsive to pulse control from sequence controller 30 while the movable portions of the other contacts in unit 32 are controlled by an indication storage unit 53. The various possible message circuits are selected in accordance with the indication function conditions existing at the time such transmissions are made.

During control periods, with contact 31 closed in its lower or *c* position, the station winding of transformer 29 is connected to receiver unit 34 and also to a voice guard circuit 38 which will be discussed later. Unit 34 includes tone receivers 35, 36, and 37 which are tuned, respectively, to the same audio frequency tones U, V, and W transmitted from the office location, as indicated by the corresponding letter shown inside each conventional block. It is to be understood that any form or type of receiver of audio frequency currents known in the art which will provide an output upon the receipt of the selected tone may be used and for this reason the details of the tone receivers are not shown.

As previously indicated, the control functions are sent or transmitted as tone combinations which are then decoded by a decoding unit 39 in accord with the output signals of the tone receivers. The control function as decoded is applied to control function storage unit 41 which records and controls the execution of the desired function. A gate circuit 40 intervenes between the tone receivers within unit 34 and tone decoder 39. This gate circuit is controlled by sequence controller 30 so as to allow the passage of tone signals detected only during control function periods. In addition, voice guard circuit 38 inhibits decoder 39 from being actuated by signals received as the result of ordinary speech transmitted over telephone circuit 5. This inhibit arrangement is necessary to prevent the incorrect recording and execution of control functions if the telephone circuit is used for ordinary conversations, e.g., between system operating personnel and maintenance personnel at the station location.

The station apparatus arrangement shown in FIG. 3 is completed by adding thereto the holding circuit arrangement illustrated in schematic form (partly by conventional block) in FIG. 4. This holding arrangement includes switch contacts 43 and 43*a* which are driven or operated between their upper and lower positions by a cam 42. Cam 42 is driven through a coupling to the drive arrangement for message announcer 33 shown in FIG. 3. For example, in the one specific application of our invention, cam 42 is driven at 8 revolutions per minute or 7½ seconds per revolution. In the mechanical arrangement schematically shown, contacts 43 and 43*a* thus occupy each of their positions, that is, upper and lower, for a period of 3¼ seconds in this specific example. It is to be understood that the arrangement of our invention also includes the substitution, for cam 42 and contacts 43 and 43*a*, of electrical and/or electronic control circuitry which provides circuit switching equivalent to that provided by contacts 43 and 43*a*.

The holding pulse signals transmitted from the office over the audio tone circuit of frequency W are supplied over connection 51 from tone receiver 37 of unit 34 through gate 40 (in FIG. 3) to contact armature 43 in FIG. 4. In accordance with the position of contact 43, these holding pulse signals are then applied to the storage units 44 and 45. Once activated by an input pulse, units 44 and 45 store the reception of this signal until they are reset. This resetting action, as indicated by the notes explaining the input connection at the right of each of these conventional blocks, occurs for unit 44 at the end of each control period and for unit 45 at the end of each indication period.

Storage units 44 and 45 control, respectively, gate circuits 46 and 47 in a manner that the associated gate circuit is open when a signal is stored in the storage unit. These gate circuits partly control the supply of holding energy to storage unit 49. It is to be noted, of course, that contact 43*a* parallels the gate circuits in the energy supply circuit network. When energy is stored in unit 49, the station apparatus is held active and functioning to receive controls and transmit indications. This energy is supplied over the conventional circuit network shown from the hold energy terminal, which may be continuously energised or only when unit 28*a* is actuated.

We shall now describe the operation of the remote control system embodying our invention with reference to all of the drawing figures as necessary. For purposes of this description, it is assumed that the system operator is located at the control or office location of FIG. 2 from which he controls the operation of the system. For the specific description, it is assumed that this operator desires communication with station 8, shown in FIGS. 3 and 4, at which there are no operating personnel.

With the key switch or pushbutton 26 in its normal position, the system operator completes a telephone call from his office telephone instrument to the telephone instrument *8a* at station 8 in FIG. 3. In the specific example, this circuit is completed by the operator dialing the telephone number of instrument *8a* into the telephone exchange 2 of FIG. 1 which then completes the circuit connections between the office location and the desired station. As soon as the ringing tone answer-back is heard in his telephone receiver, the operator actuates pushbutton 26 (FIG. 2) in order to close the contact in its upper position. This action disconnects the office telephone instrument and connects the line winding of transformer 20 to the telephone circuit 4 and thus to the channel completed to the desired station location. It is to be remembered that pushbutton 26 sticks in this operated position until restored by a manual action. Through coupling transformer 20, amplifier 21 and speaker 22 are coupled to the channel just completed. Also coupled to the channel are tone transmitters 17, 18, and 19.

At station 8 in FIG. 3, the ringing signal is detected by unit **28*b* since the contact of unit 28*a* is in its normal lower position. The detection of this ringing signal causes an output signal to be applied by unit 28*b* to start the sequence controller 30. The actuation of unit 30 starts the drive motor for message announcer 33 over connection 54. During its operation, the drive motor of unit 33 produces pulses which are applied over connection 55 to operate sequence controller 30 through its cycle of operation. The ringing signal continues during period A shown within the conventional block of unit 30 by the symbolic sequence chart. In the specific example previously recited, that is, where the timing of cam 42 is 7½ seconds per revolution, period A is of 12 seconds duration. At the end of this time period, a pulse is applied from sequence controller 30 as indicated by connection 57 to line hold unit 28*a* to shift its contact to the upper position, thus connecting coupling transformer 29 to telephone line 5. At this time, by any well known control means, designated conventionally by dotted line 58, responsive to this pulse, switch contact 31** is operated to, or held in, its upper position to close the circuit over contact *i*. It is to be further noted that contact 31 is held in this upper position, as indicated conventionally by branch line **58*a*, until the occurrence of the output pulse from unit 30 at the end of period B. After this pulse, the control of switch 31 is restored to cam movement 42**, for operation in the manner defined by the explanatory note on FIG. 3.

Since the normal positions of the switching contacts within unit 32 are as shown, message announcer 33 at this time transmits the telephone number code of the station to the office location. It is to be noted that the message announcer is coupled over contact 31 in its upper position through transformer 29 to the telephone line. This message announcing the selected telephone number is repeated 3 times during the period B indicated symbolically within unit 30. In the specific example previously described, period B has a duration of 22½ seconds. This verbal message transmitted from the station of FIG. 3 is reproduced at the office through amplifier 21 and speaker 22 and confirms this selection of the desired station, that is, the station whose telephone number was dialed by the system operator to initiate the action.

At the end of period B, sequence controller 30 provides a pulse as indicated to shift contact **32*a* within unit 32 to close in its lower position. The initial holding of contact 31 is released by this pulse but cam 42 retains contact 31** closed in its *i* position. Contacts **32*b* and 32*c* are already positioned by indication storage unit 53 in accordance with the existing conditions of the apparatus to be indicated from this station. During the subsequent period C indicated within the conventional block of unit 30, an indication period, the selected indications are transmitted by message announcer 33 to the office location. At this time, the circuit from unit 33 to transformer 29 includes contacts 32*b* and 32*c* in their established positions, contact 32*a* closed in its lower position, and contact 31** closed in its *i* position. The circuit is thence coupled through transformer 29 to telephone line 5 over contact **28*a* closed in its upper position. In the specific example previously mentioned, indication period C and any subsequent periods utilized, are of 7½ seconds' duration. This indication message is reproduced at the office by audio amplifier 21 and speaker 22**. Obviously, it must be recorded by the operator in order to maintain a record of the conditions at the field stations. It is also obvious that the indication function message may be transmitted in a form which may be automatically recorded, stored, and displayed at the office to provide a semi-permanent record until later changes in the indications are received. It is intended that the system of our invention also include such type of indication transmission.

To this point in the operating cycle, the operation of the station apparatus is automatic, that is, it proceeds without directions from the control office after the station is selected. During this portion of the operation, the station apparatus is locally held on the line, that is, during the ringing period, the period of announcement of the selected telephone number, and the first indication period. Since this action occurs without regard to pushbutton 26 at the office being in its actuated position, these cycles of action during periods A, B, and C occur at station 8 if local telephone *8a* is called, that is, its number is dialed, from a location other than the control office. However, it is to be noted that, to this point in the cycle of station operation, nothing has occurred except the transmission of the existing indications.

Referring, however, specifically to the present call from the control office, if pushbutton 26 is retained in its operating position, hold pulses transmitted from the office are received and the station operation continues. This actual holding operation will be described shortly. At station 8, sequence controller 30 now moves into period D which is a control function period. The sequence control at the station is such that switch 31 is now shifted, by its coupling to cam 42, to its other position so that the armature closes lower contact *c*, thus connecting the tone receivers to coupling transformer 29. The operator at the office selects the combination of audio frequency tones which will provide the control function he desires. This action is accomplished by actuating, that is, closing the desired combination of switches 12, 13, and 14. The tones transmitted from the office are received by the corresponding tone receiver units 35, 36, and 37 and, depending upon the tones received, signals are passed into tone decoder 39. Gate circuit 40 is opened at this time by a pulse received from sequence controller 30 as indicated by the conventional output connection associated with period D. The control functions are recorded and executed by storage unit 41. As long as pushbutton 26 remains actuated, control and indication periods will continue alternately in the cycle of operation, each such period being 7½ seconds in length. Thus, in the schematic symbol within the conventional block designating unit 30, indication period E follows in sequence after control period D.

During these added periods of operation, that is, following period C, the station apparatus must be externally held active and in contact with the telephone line. Otherwise the station apparatus resets to its normal or at-rest condition shown in FIG. 3. The holding pulses for retaining the station apparatus active are transmitted from the office, being generated in hold pulse generator 15. As previously mentioned, the output of this generator is applied to tone transmitter 19 which generates the audio frequency W but under these conditions at a reduced volume level. At the station (FIG. 3) during indication periods with switch 31 in its *i* position, the holding pulses received are ineffective as they are not applied to receiver unit 37 which is tuned to audio frequency W. However, during control periods, the holding pulses are applied to receiver unit 37 and the output is then applied over connection 51 to contact 43 in FIG. 4. This action is possible since switch contact 31 is released at the beginning of each control period so that it closes the circuit over its lower contact point *c*. At the beginning of each control period, cam 42 in FIG. 4 occupies the position shown in its counterclockwise revolution cycle. Thus, at the beginning of period D, contact 43 is closed in its upper position connecting storage unit 44 to lead 51 over which the holding pulse signals are received.

We shall refer now to FIG. 5 for a timing chart illustrating the holding operation at the station location. The extreme left edge of the chart corresponds with the beginning of control period D as indicated by the top line of this chart. Subsequent indication and control periods following period D are also indicated across the top of the chart. Each such period is further shown, by vertical dotted lines, as divided by the operation of cam 42 into equal portions which are established by the movement of contacts 43 and 43*a* between their upper and lower positions, respectively. The occurrence of the holding pulse signals during these periods are indicated in line (*a*) of the chart. The first such holding pulse received during period D is applied to unit 44 as indicated in line (*c*). This results since contacts 43 and 43*a*, as indicated in line (*b*), during the first half of period D are closed in their upper positions. The specific circuit for applying the holding pulse to unit 44 is shown in FIG. 4. During the second half of period D, contact 43, as indicated in line (*b*), is in its lower position and storage unit 45 receives the holding pulse signals of line (*a*) as indicated in line (*d*). It is to be remembered that, when unit 44 or 45 stores a holding signal, the corresponding gate circuit 46 or 47, respectively, is opened. Unit 49 then receives holding energy from the supply terminal. Lines (*e*) and (*f*) of the chart represent the energy condition of storage unit 49 under different situations to be discussed shortly.

We shall first discuss the situation in which the system operator releases pushbutton 26 at a point in the cycle of operation corresponding to point X indicated in line (*a*) of the chart. It is to be noted that the holding pulse signals in line (*a*) are shown in dotted manner during an indication period such as period E since they are not effective to actuate storage units 44 and 45 at such time, as was previously described. In the situation determined by point X, the holding pulses received during period D actuate storage units 44 and 45 in the manner previously described. This is controlled during the second half of period D in accordance with the operation of cam 42 to transfer contact 43 from its upper to lower position. Referring now to line (*e*) of the chart, it is noted that, during the first half of period D, when contact 43*a* is closed, unit 49 is energized by a direct circuit over contact 43*a* from the hold supply terminal to unit 49. Of course, after unit 44 receives the initial holding pulse signal, gate circuit 46 is open so that energy is also supplied in this parallel circuit to unit 49 as may be determined by reference to FIG. 4. At the beginning of the second half of period D, contact 43*a* opens. During the second half of period D, however, energy is supplied to unit 49 through this gate circuit 46 since unit 44 holds in its storage condition. Also during a portion of this sub-period, gate circuit 47 is open, after unit 45 receives a holding pulse signal, so that again parallel circuits are available for supplying energy to unit 49.

During the first half of the following period E, an indication period, storage unit 49 again receives energy over contact 43*a* which is closed by cam 42. During the second half of period E, gate circuit 47 remains open since storage unit 45 holds its storage until reset at the end of the indication period. It is to be noted that storage unit 44 was reset at the end of period D, a control period. In a similar manner, contact 43*a* is closed and holds unit 49 energized during the first half of the subsequent period F, a control period. However, since pushbutton 26 was released at the office at point X in the specific situation here described, unit 49 is deenergized at the mid point of period F when contact 43*a* opens. This occurs since both storage units 44 and 45 have been reset and no holding pulse signals are received during the first part of period F. Thus, gate circuits 46 and 47 are both closed to block the supply of energy to unit 49 after contact 43*a* opens. Upon the deenergization of unit 49 at the mid point of period F, the station apparatus is reset to its normal or at-rest condition and further action of the sequence is halted.

We shall now consider the situation in which the system operator at the office releases pushbutton 26 at a point in the sequence designated by the character Y shown in line (*a*) of FIG. 5. It is to be noted that point Y occurs during the first half of period F of the operational sequence. The condition of the hold storage unit 49 under this situation is illustrated in line (*f*) of FIG. 5. It is to be noted that during periods D and E of the sequence, the condition of unit 49 is the same as for the previously discussed situation, that is, release of pushbutton 26 at point X. Summarized briefly, since both storage units 44 and 45 receive hold pulse signals during period D, the gate circuits 46 and 47 are effective to hold unit 49 energized during those portions of periods D and E that contacts 43*a* is open.

As indicated in the chart, a hold pulse is received early in the first half of period F and with upper contact 43 closed, a corresponding signal is applied to storage unit 44. Since period F is a control period, unit 44 will hold this received storage until the end of the period at which time a reset action occurs. Thus, gate circuit 46 will be open during at least the second half of period F to retain a completed circuit for unit 49 from the hold energy supply terminal. During the first half of period F, contact 43*a* is closed so that a parallel circuit for energizing unit 49 also exists. With the release of pushbutton 26 at least during the first half of period F, storage unit 45 does not receive any hold pulse signal during the second half of this period when the lower contact of 43 is closed. Thus gate circuit 47 remains closed after the reset of storage unit 45 at the end of indication period E. Having been held energized during the duration of period F by the previously discussed circuits, unit 49 is further held energized during the first half of period G by the closing of contact 43*a* in the cycle of cam 42. However, when contact 43*a* opens at the mid point of period G, all circuits for unit 49 from the holding energy terminal are interrupted, since gate circuits 46 and 47 are closed. With hold storage unit 49 thus deenergized, the station apparatus releases and returns to its inactive or at-rest condition. Contact 28*a* shown in FIG. 3 is restored to its lower position so that the connection is completed between telephone line 5 and ringing detector device 28*b*. This operation of contact 28*a* resets the station apparatus, that is, sequence controller 30 resets to condition the apparatus to respond to another ringing cycle when another call is made to this station.

It has been previously discussed that each remote station upon the initiation of a sequence of operations establishes a local holding condition which maintains the station apparatus active during the ringing period A, the period B during which announcement of the selected telephone number is transmitted, and during the first indication period C. It is to be noted that, unless a hold pulse is received during the first half of the first control period D, the remote station apparatus is reset at the mid point of period D. This action is similar to but occurs prior to that discussed for the condition of release at point X. This presently defined condition occurs, for example, if the particular remote station is dialed from any telephone location other than that of the control office. This situation also occurs if the system operator, desiring only a single indication announcement, releases pushbutton 26 immediately upon the termination of the indication announcement occurring during indication period C.

It will be apparent from the foregoing discussion that, by providing at the control office a timing device, for example, hold pulse generator 15, which is capable of providing or transmitting to the selected remote station signals which occur within intervals established by a second timing device at the station, here the mechanical drive by cam 42 of contacts 43 and 43*a*, the holding of the remote station apparatus active and connected to the communication line can be accomplished without the use of any synchronization between the office and the remote station. Furthermore, the disconnection of the remote station from its line connection, following the release of the office apparatus, is always accomplished within a predetermined period. Thus a relatively simple and economical arrangement is provided using the commercial telephone network by which controls and indications may be transmitted at selected times between a control office and several remote stations, each selected individually. No permanent communication channel is required, thus saving the cost and maintenance of such an installation. In addition, the leased telephone circuits can be used, if desired, for ordinary communication purposes in addition to the transmission of the control and indication functions.

Although we have herein shown and described but one form of a remote control system embodying our invention, it is to be understood that various changes and modifications may be made therein within the scope of the appended claims without departing from the spirit and scope of our invention.

Having thus described our invention, what we claim is:

1. In a remote control system, the combination comprising, (a) a central office and a plurality of remote station locations, each with apparatus for transmitting and receiving functions, (b) communication circuit means for selectively connecting said office and a single station for the transmission of control and indication functions, (c) sequencing means at each station responsive only to the selection of that station for locally driving the station apparatus through successive periods of operation to alternately transmit and receive functions, (d) a pulse transmitter at said office with connections to said circuit means for transmitting a series of pulses of distinctive character to a selectively connected station as long as said office apparatus is active, (e) holding means at each station having connections controlled by the associated sequencing means and responsive to the reception of said distinctive pulses from said office only during selected periods of station operation for retaining the associated station apparatus active beyond a preselected initial cycle of operation when said office apparatus remains active.

2. In a remote control system, the combination comprising, (a) a central office and a plurality of remote station locations, each with apparatus for transmitting and receiving functions, (b) communication circuit means for selectively connecting said office and a single station for the transmission of control and indication functions, (c) sequencing means at each station responsive only to the selection of that station for locally driving the station apparatus through successive periods of operation to alternately transmit and receive functions, (1) said station apparatus initially responsive to said sequencing means for remaining active through a preset initial cycle of said periods independent of the operation of said control office, (d) a pulse means at said office with connections to said circuit means for transmitting consecutive hold signals when said office apparatus is active, (e) holding means at each station having connections for receiving said hold signals from said office and controlled by the associated sequencing means to respond to said hold signals after said present cycle for retaining the associated station apparatus active until said office is disconnected from said circuit means.

3. In a remote control system including a control office and a plurality of remote station locations, each location provided with apparatus for transmitting functions to and receiving functions from at least one other location, the combination comprising, (a) a communication circuit network with extensions to each location of said remote control system, (b) manually controlled means with control connections to said network and to the apparatus at each system location for at times completing connections over said network between said office and an individually selected remote station, (c) a timing means at each station initially responsive only to selection of that station for locally driving the station apparatus through a predetermined cycle of operation to transmit selected functions, (1) said station timing means having other connections for locally dividing station operation subsequent to said predetermined cycle into a sequence of periods of predetermined length and of alternate character, (d) another timing means at said office responsive to the completion of a network connection between said office and a selected station for transmitting periodic holding signals over said network to said selected station, (e) a holding means at each station controlled by the associated station timing means and responsive to said holding signals for retaining the associated station apparatus active beyond said predetermined cycle only if said holding signals are received during preselected periods of said subsequent station operation.

4. In a remote control system including a control office and a plurality of remote station locations, each location provided with apparatus for transmitting and receiving condition functions over a communication circuit, the combination comprising, (a) a telephone network including a central exchange and having a local line to each remote control system location, (b) means at the remote control system office controlling said central exchange for selectively establishing connections over said local lines between said office and an individual station, (c) switching means at each station responsive to the selection of that station for connecting the associated station apparatus to the corresponding local line, (d) another switching means at said office manually operable for connecting the office apparatus to the corresponding local telephone line, (e) a timing means at each station initially responsive only to selection of that station for locally driving the station apparatus through a predetermined cycle of operation to transmit selected functions, (1) said station timing means having other connections for locally dividing station operation subsequent to said predetermined cycle into a sequence of periods of predetermined length and of alternate character, (f) another timing means at said office responsive to the completion of a network connection between said office and a selected station for transmitting periodic holding signals over said network to said selected station, (g) a holding means at each station controlled by the associated station timing means and responsive to said holding signals for retaining the associated station apparatus active beyond said predetermined cycle only if said holding signals are received during periods of said subsequent station operation having a preselected one of said alternate characters.

5. A remote control system, comprising in combination, (a) a control office and a plurality of remote station locations, (b) a communication network for at times providing connections between said office and said stations, (c) switching means at said office operable to connect the office apparatus to said network, (d) selection means controlled by said office for selectively connecting a desired station, (e) sequencing means at each station controlled by said selection means for independently driving the station apparatus through a preselected sequence of operation when that station is selected, (f) transmitter means at said office connected to said network by said switching means for transmitting control functions to the selected station, (g) means at each station for receiving and recording control functions, (h) transmitter means at each station for transmitting indication functions to said office, (i) a switching means at each station controlled by the associated sequencing means for switching the station network connection between the associated station receiving and transmitter means at preselected intervals in the operational sequence, (j) another transmitter means at said office connected to said network by said office switching means for transmitting hold signals when the office apparatus is held active, (k) holding means at each station having connections to said network when the associated station is selected for receiving said hold signals, (1) said hold means further controlled by the associated sequencing means for responding to said hold signals to retain said station connected to said network only when said hold signals are successively received during preselected portions of said cycle of operations.

6. A remote control system comprising in combination:

(a) a control office with apparatus for exercising supervisory control over said remote control system, (b) a plurality of remote stations each with apparatus for receiving control functions from and transmitting indication information to the control office apparatus, (c) a communication network with a local extension to each location of said remote control system, (d) switching means with connections for selectively establishing circuit connections through said network between said control office and any individually selected station, (e) a detection means at each station with connections to said network and responsive to the selective connection of the corresponding station with said office, (f) a first timing means at each station controlled by the associated detection means for activating the associated station apparatus to initiate the transmission of indication information when that station has been selectively connected with said office, (1) said first timing means being further responsive to the continued operation of said associated station apparatus for dividing that operation into an initial period and a subsequent series of consecutive periods of alternate character, (2) the operation of said associated station apparatus during said initial period being independent of the operation of said office apparatus, (g) another timing means at said office with connections to said network when said office apparatus is active for transmitting a consecutive series of periodic distinctive signals, (h) holding means at each station with connections for holding the associated station apparatus active to continue the transmission of information when said holding means is actuated, (i) a second timing means at each station controlled by the associated first timing means for dividing each of said subsequent periods of operation, (j) storage means at each station controlled by the associated second timing means and having connection to said network for detecting the distinctive signals received during divisions of each subsequent period of a preselected character, (1) said storage means storing during the succeeding period the reception of a distinctive signal during the last division of said preselected period, (k) actuating circuit means at each station controlled jointly by the associated storage means and second timing means for retaining said holding means actuated during successive subsequent periods only as reception of said distinctive signals is detected during all divisions of said period of preselected character.

References Cited

UNITED STATES PATENTS

| | | | |
|---|---|---|---|
| 2,919,307 | 12/1959 | Bachelet et al. | 340—163 |
| 3,266,018 | 8/1966 | Higgins | 340—151 |
| 3,308,239 | 3/1967 | Waldman et al. | 179—2 |

KATHLEEN H. CLAFFY, *Primary Examiner.*

L. A. WRIGHT, *Assistant Examiner.*